United States Patent [19]
Jette

[11] Patent Number: 5,953,870
[45] Date of Patent: Sep. 21, 1999

[54] RAISED FLOOR SYSTEM AND CABLE SUPPORT APPARATUS

[76] Inventor: Roger Jette, 17 Prospect St., Babylon, N.Y. 11702

[21] Appl. No.: 08/927,506

[22] Filed: Sep. 11, 1997

[51] Int. Cl.⁶ ...................................................... E04B 5/48
[52] U.S. Cl. ......................... 52/220.1; 52/126.2; 52/263; 248/49
[58] Field of Search ................................ 52/126.2, 126.5, 52/126.6, 126.7, 263, 220.1, 220.5, 660; 174/48; 248/49, 68.1

[56] References Cited

U.S. PATENT DOCUMENTS

| | | | |
|---|---|---|---|
| Re. 35,479 | 3/1997 | Witherbee et al. | 248/49 |
| 3,363,048 | 1/1968 | Vaughn . | |
| 3,844,440 | 10/1974 | Hadfield et al. | 220/3.7 |
| 4,124,324 | 11/1978 | Augis et al. | 404/3 |
| 4,372,510 | 2/1983 | Skypala . | |
| 4,593,499 | 6/1986 | Kobayashi et al. | 52/126.6 |
| 4,596,095 | 6/1986 | Chalfant . | |
| 4,612,746 | 9/1986 | Higgins | 52/221 |
| 4,630,417 | 12/1986 | Collier | 52/263 |
| 4,676,036 | 6/1987 | Bessert | 52/126.6 |
| 4,765,576 | 8/1988 | Peled . | |
| 4,850,162 | 7/1989 | Albrecht | 52/126.6 |
| 5,049,700 | 9/1991 | Kobayashi et al. | 174/48 |
| 5,123,618 | 6/1992 | Guterman et al. . | |
| 5,263,289 | 11/1993 | Boyd | 52/220.2 |
| 5,389,737 | 2/1995 | Kobayashi et al. | 174/48 |
| 5,412,914 | 5/1995 | Daw et al. . | |
| 5,477,649 | 12/1995 | Bessert . | |
| 5,483,776 | 1/1996 | Poppe | 52/220.3 |
| 5,531,410 | 7/1996 | Simon | 248/49 |
| 5,546,717 | 8/1996 | Penczak | 52/220.5 |
| 5,548,932 | 8/1996 | Mead . | |
| 5,628,157 | 5/1997 | Chen | 52/263 |
| 5,630,300 | 5/1997 | Chen | 52/220.5 |
| 5,673,522 | 10/1997 | Schilham | 52/263 |
| 5,697,193 | 12/1997 | Forslund, III et al. | 52/220.5 |
| 5,768,840 | 6/1998 | Feldpausch et al. | 52/239 |

FOREIGN PATENT DOCUMENTS

| | | | |
|---|---|---|---|
| 2155 625 | 11/1971 | Germany . | |
| 2 015 268 | 9/1979 | United Kingdom | H02G 3/12 |
| WO 90/10966 | 9/1990 | WIPO | H02G 3/28 |

OTHER PUBLICATIONS

International Search Report for Int'l. Appln. No. PCT/US98/19051.

*Primary Examiner*—Beth Aubrey
*Attorney, Agent, or Firm*—Dilworth & Barrese

[57] ABSTRACT

A raised floor system is provided which includes a plurality of support pedestals; a plurality of floor panels; and a cable support apparatus which includes: a first elongated stringer element defining a horizontally disposed surface which is configured and dimensioned to support a portion of at least one of the plurality of floor panels, the first elongated stringer element being supported a predetermined distance away from a base by a first pair of the plurality of support pedestals; a second elongated stringer element defining a horizontally disposed surface which is configured and dimensioned to support a portion of at least one of the plurality of floor panels, the second elongated stringer element being supported a predetermined distance away from a base by a second pair of the plurality of support pedestals; and a channel section suspended from the first and second stringer elements, the channel section being configured and dimensioned to support lengths of cable thereon.

27 Claims, 5 Drawing Sheets

RAISED FLOOR SYSTEM AND CABLE SUPPORT APPARATUS

BACKGROUND

1. Technical Field

The present disclosure relates to raised floor systems and more particularly to a cable support assembly for use in connection with a raised floor system.

2. Description of Related Art

Raised floor systems have been developed to provide the additional utility space needed in various different conduit or cable intensive environments where the original construction did not provide adequate means of accommodating the vast amount of conduit or cable. For example, probably the most common environment requiring vast amounts of additional protected space is for large computing systems. Such installations were typically made in facilities which simply were not designed to accommodate the vast amount of cable runs required to operate the typical large computer system. Other applications where additional utility space is required include mechanical systems, e.g., heating, ventilating and air conditioning systems.

A common problem experienced in utilizing raised floor systems is maintaining organization of the various cables, conduits, pipes, etc. which are routed beneath the floor system. One solution to this problem is to provide a cable tray system beneath the floor panels of the raised floor to contain and direct cables along their respective pathways. An example of such a cable tray system is disclosed in U.S. Pat. No. 4,596,095 which issued on Jun. 24, 1986 to Chalfant (the "'095 Chalfant Patent"). The '095 Chalfant Patent features a modular cable tray assembly which is formed from modular sections which include a number of different components all of which must be separately assembled to form the cable tray. For example, the cable tray includes separate straight sections, horizontal bend sections, horizontal tee sections, horizontal cross-intersection sections, as well as splice plates to connect the various components to each other as well as supporting the assembled cable tray above the building floor. Such a cable tray assembly is, therefore, independent of the raised floor system.

One drawback of such a raised floor and cable support system is the additional labor required to assemble the various components of the separate raised floor and cable support systems. In geographic regions with particularly high labor rates, the cost of erecting such a labor intensive dual system could prove to be cost prohibitive.

Another drawback of such a system is that the amount of space required by the structural supporting components of the two separate systems leaves less space available for carrying and organizing larger numbers of cable runs.

Yet another drawback of installing independent raised floor and cable support systems is the cost of procuring the materials required for two separate support structures. These additional labor and material costs can significantly increase the overall cost of installing a complete system.

An alternative solution to supporting cable runs below a raised floor assembly is proposed in U.S. Pat. No. 5,548,932 which issued on Aug. 27, 1996 to Mead (the "'932 Mead Patent"). The '932 Mead Patent features a height adjustable cable tray support system which includes a number of separate components which must be assembled to form the cable support system. Plates which support the cable tray are secured by welding or other methods to the pedestals of the existing raised floor system featured in the '932 Mead Patent. Additionally, support rods are required in the '932 Mead Patent cable tray support system, which support the cable tray on the support plates.

One disadvantage of such a system is the labor intensive nature of the installation. In particular, each support plate must be separately secured to the floor system pedestals and the support rods and cable tray sections must be installed. This combined with the cost of the material components required for such a system can add significant cost to the installation of the complete system.

Accordingly, there is a continuing need for improved raised floor and cable management systems which require fewer number of components. A need also exists for raised floor and cable management systems which are easier to install than existing systems and which provide increased storage capacity and accessibility.

SUMMARY

The present disclosure provides a raised floor system which overcomes the above-noted and other disadvantages of existing raised floor and cable management systems. Additionally, the present disclosure provides a raised floor system which requires many fewer components to assemble thereby resulting in greatly reduced material and labor costs to install a complete raised floor and cable management system or to upgrade an existing raised floor system with the presently disclosed cable support assembly.

In one aspect of the present disclosure a raised floor system is provided which includes a raised floor system, which includes a plurality of support pedestals; a plurality of floor panels; and a cable support apparatus which includes: a first elongated stringer element defining a horizontally disposed surface which is configured and dimensioned to support a portion of at least one of the plurality of floor panels, the first elongated stringer element being supported a predetermined distance away from a base by a first pair of the plurality of support pedestals; a second elongated stringer element defining a horizontally disposed surface which is configured and dimensioned to support a portion of at least one of the plurality of floor panels, the second elongated stringer element being supported a predetermined distance away from a base by a second pair of the plurality of support pedestals and a channel section suspended from the first and second stringer elements, the channel section being configured and dimensioned to support lengths of cable thereon.

The channel section may be formed of an open architecture defining a plurality of openings therein. Additionally, the channel section may be formed of wire stock. The channel section may further include a plurality of support members extending from the first elongated stringer element to the second elongated stringer element. In such an arrangement, the plurality of support members are preferably maintained at a predetermined distance from each other.

The channel section may be suspended from the first and second elongated stringers by permanently securing the channel section to the first and second elongated stringers.

In another aspect of the present disclosure a cable support apparatus is provided for use with a raised floor system including a plurality of support pedestals and floor panels. The cable support apparatus includes first and second stringer elements, each of the stringer elements being adapted for removable engagement with respective support pedestals of a raised floor system such that the first and second stringer elements interconnect the respective support pedestals of the raised floor system, each of the first and second stringer elements defining a horizontally disposed upper surface which is configured and dimensioned to support a portion of a floor panel of the raised floor system; and a channel section suspended from the first and second stringer elements, the channel section being configured and dimensioned to support lengths of cable thereon.

In yet another aspect of the present disclosure, a modular cable support assembly is provided which includes a plurality of support pedestals; a plurality of cable support apparatus each of which includes: a first elongated stringer element defining a horizontally disposed upper surface thereof which is configured and dimensioned to support at least a portion of a floor panel, the first elongated stringer element being supported a predetermined distance away from a base by a first pair of the plurality of support pedestals; a second elongated stringer element defining a horizontally disposed upper surface thereof which is configured and dimensioned to support at least a portion of a floor panel, the second elongated stringer element being supported a predetermined distance away from a base by a second pair of the plurality of support pedestals; and a channel section suspended from the first and second stringer elements, the channel section being configured and dimensioned to support lengths of cable thereon.

In a still further aspect of the present disclosure, a cable support apparatus is provided for use with a raised floor system including a plurality of support pedestals, stringers and floor panels, the cable support apparatus including a channel section configured and dimensioned to support lengths of cable thereon; and means for suspending the channel section from the stringers of the raised floor system. The channel section may be formed of an open architecture.

BRIEF DESCRIPTION OF THE DRAWINGS

Preferred embodiments of the presently disclosed raised floor system and cable support assembly are described herein with reference to the drawings, wherein.

DETAILED DESCRIPTION OF PREFERRED EMBODIMENTS

Figure 1:
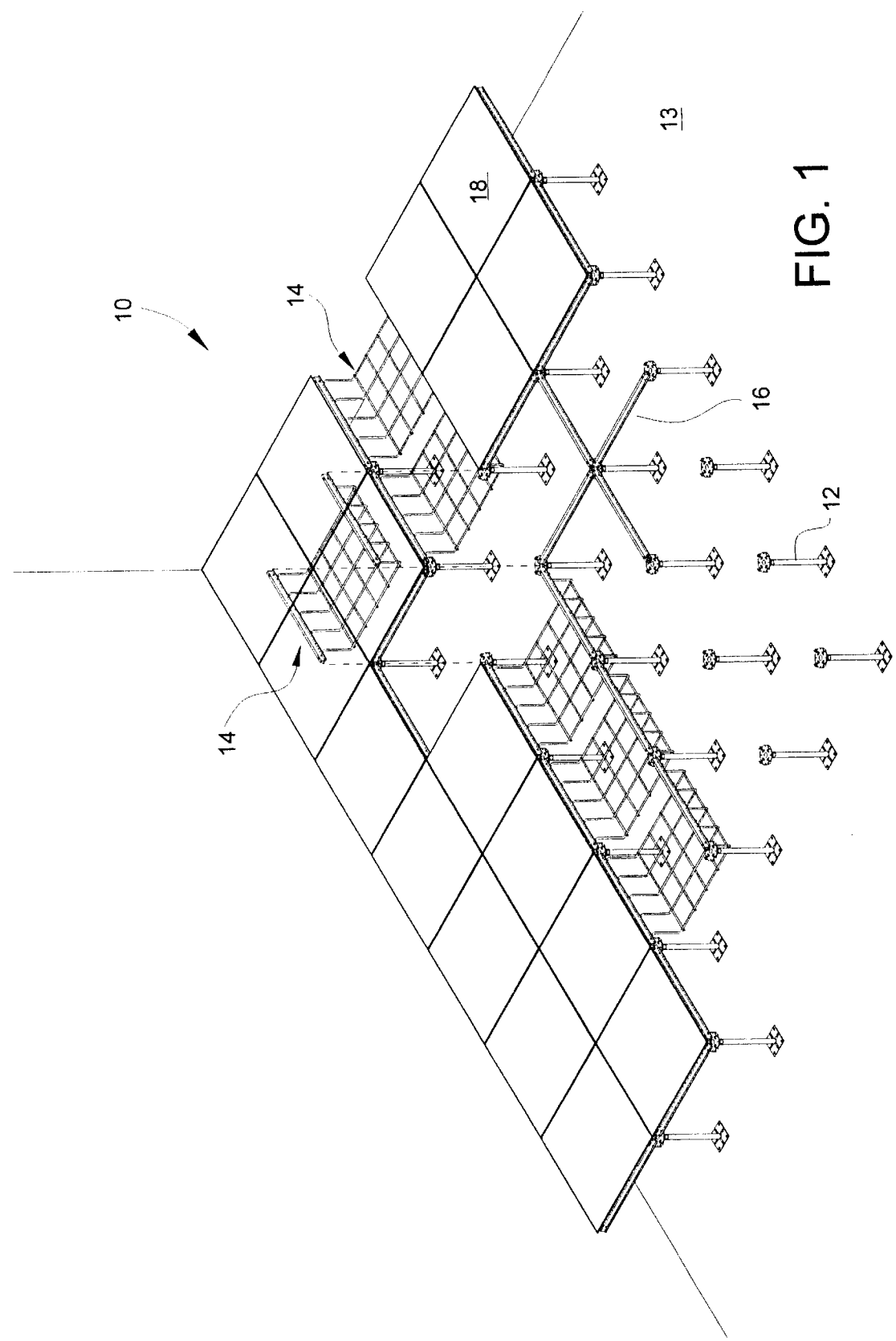
FIG. 1 is a perspective view of one embodiment of a raised floor system constructed in accordance with the present disclosure.

Referring now in specific detail to the drawings in which like reference numerals identify similar or identical elements throughout the several views, and initially to FIG. 1, one embodiment of a raised floor system constructed in accordance with the present disclosure is shown generally as raised floor system 10.

Generally, raised floor system 10 includes a series of support pedestals such as stanchions 12 which are disposed in a predetermined array on a base such as floor 13. A cable support assembly is provided in raised floor system 10 and includes a series of cable support apparatus such as cable baskets 14 which are disposed relative one another to form a predetermined passageway for carrying cables or the like thereon. Preferably cable baskets 14 form an integral part of floor system 10. Stanchions 12 are interconnected by stringer members 16 so as to define a lattice work which receives individual floor panels 18 therein to form the completed raised floor system 10.

In certain installations it may be desirable or necessary to install the cable support assembly as a stand-alone modular assembly. It is within the scope of the present disclosure, that in such an installation, cable baskets 14 will be supported a predetermined distance above the building floor 13 by independent stanchions 12 or other suitable supports which are not also used to support the raised floor system 10.

Figure 2:
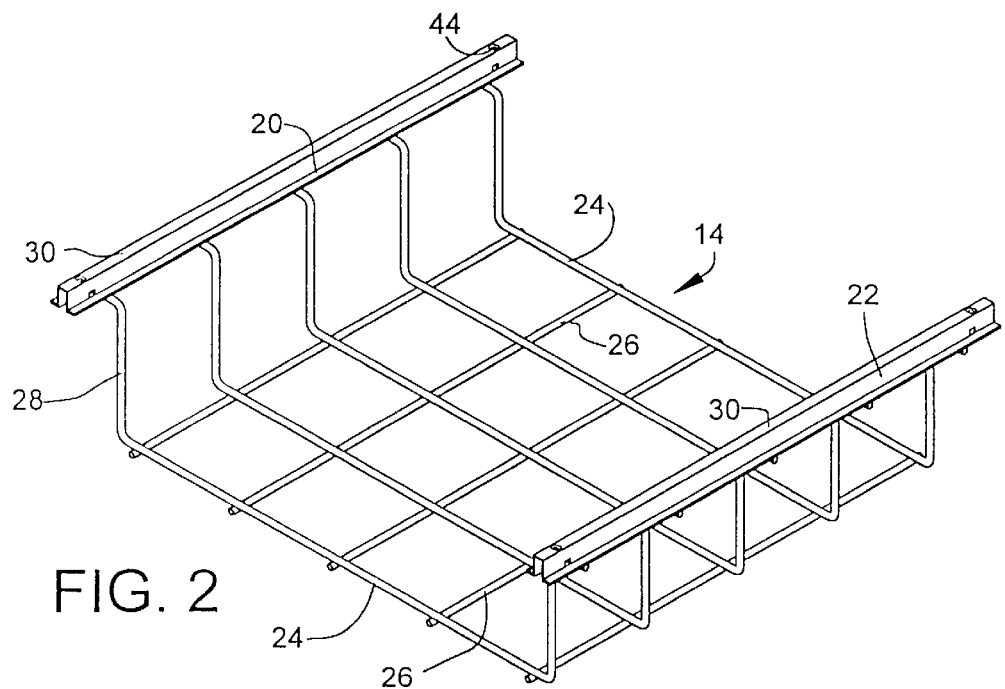
FIG. 2 is a perspective view of a cable support assembly embodiment constructed in accordance with the present disclosure.

Referring now to FIG. 2, cable basket 14 includes first and second elongated stringer elements 20 and 22, respectively. A channel section is suspended from stringers 20 and 22 so as to form a portion of a passageway for supporting cable runs thereon. In the illustrated embodiment, the channel section is formed of an open ended wire stock basket having longitudinal sections 26 attached to transverse sections 24. Transverse sections 24 include riser portions or legs 28 which are attached to the underside of stringers 20 and 22. The various elements of cable support assembly 14 are preferably joined by suitable known techniques, such as by welding.

Although the illustrated channel sections formed of wire stock material, it is within the scope of the present disclosure to use other materials as well. For example, the channel section may be formed of solid or woven fabrications of various metals or any other material suitable for supporting cable runs thereon.

Figure 3:
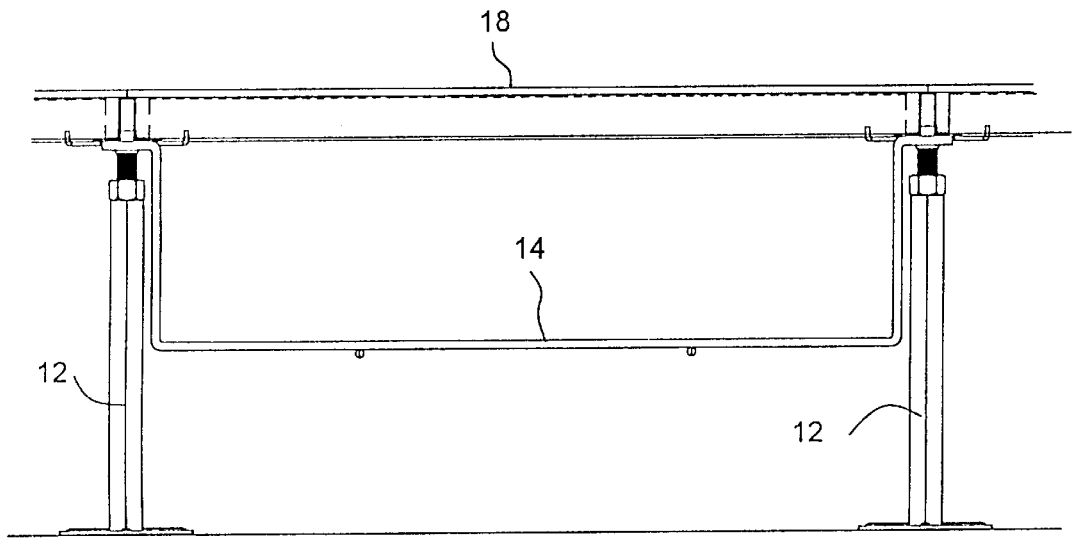
FIG. 3 is a side view of the cable support assembly of FIG. 2 in place in a raised floor system.
Figure 5:
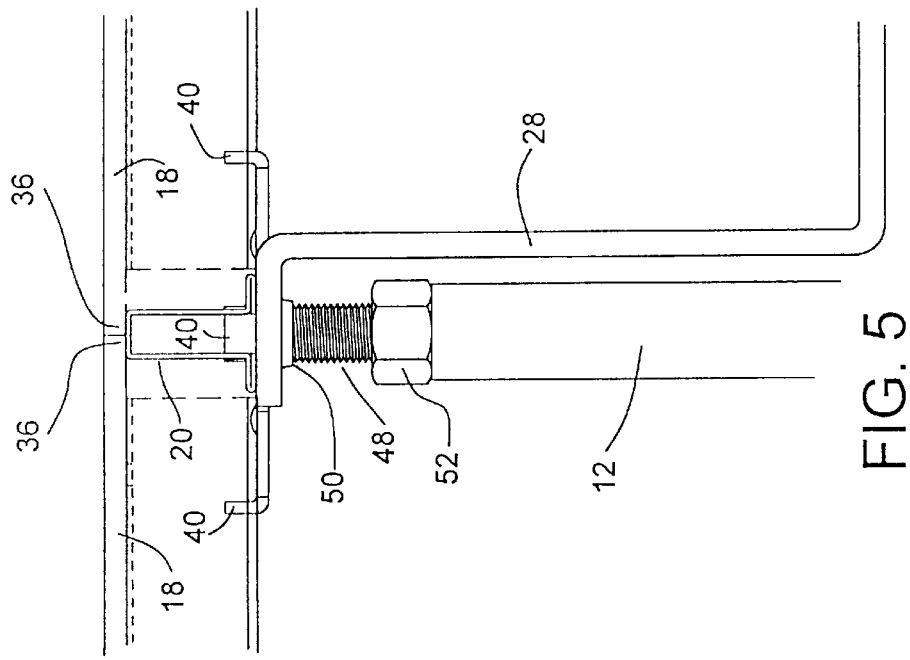
FIG. 5 is a side view showing the cable support assembly partially cut away as installed in the raised floor system of the present disclosure.
Figure 4:
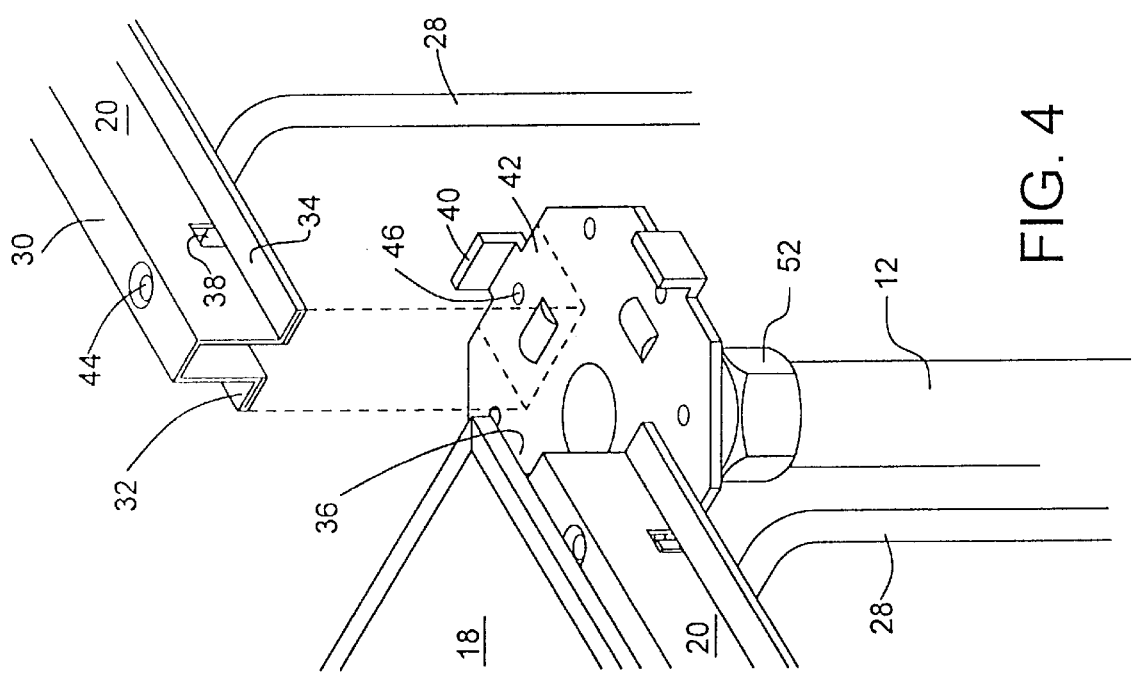
FIG. 4 is an enlarged partial perspective view of a cable support assembly in a raised floor system of the present disclosure.

Referring now to FIGS. 3–5, the integration of cable baskets 14 into raised floor system 10 will now be described in detail. Preferably, a single section of cable basket 14 is supported by four stanchions 12 (as shown in FIG. 1). However, it is within the scope of the present disclosure that cable baskets 14 may be modified so as to be supported by more or less than four stanchions 12.

As shown in FIG. 3, cable baskets 14 are supported by stanchions 12 such that the longitudinal and transverse elements 26 and 24 respectively are spaced a predetermined distance from the permanent floor 13. When installed, cable baskets 14 do not interfere with the placement or fit of floor panels 18. Rather, cable baskets 14 are designed to be incorporated into existing raised floor systems without departing from the factory design specifications of the floor system. For such installations, cable baskets 14 replace parallel end to end links of stringers 16 from the existing raised floor system.

As shown in FIG. 4, cable support assembly sections 14 include stringer elements such as stringers 20 and 22 which have a cross sectional "top hat" shape that includes an inverted U-shaped cross section portion having flanges 32 and 34 formed on either side. Horizontal surface 30 forms the uppermost surface of stringers 20 and 22. It is on surface 30 which a peripheral flange 36 formed on floor panels 18 rests. As best illustrated in FIG. 5, the peripheral flanges 36 of adjacent floor panels 18 are both supported by a single stringer element 20 or 22 on surface 30. In order to maintain the relative positioning of stringer elements 20 and 22 with respect to stanchion 12, stringer elements 20 and 22 are provided with notched portions 38 which are configured and dimensioned to fit over bracket portions 40 of stanchion base plate 42.

Stringer elements 20 and 22 are further provided with preformed holes 44 which when properly installed are vertically aligned with preformed holes 46 formed in stanchion base plate 42. In this manner, stringer elements 20 and 22 may be secured to stanchion 12 to provide added structural integrity to the overall system. As is common in conventional floor systems, floor system 10 is preferably provided with a high adjustment mechanism to adjust the height of stanchion base plate 42 in order to accommodate slight variances in the subfloor 13. This height adjustment capability may be facilitated by, for example, threaded stud 48 being received in a threaded bore 50 formed in base plate 42 at one end and in a threaded opening of stanchion 12. A nut 52 is provided and is threaded around stud 48 positioned adjacent the top of stanchion tube to facilitate adjustment and locking of the vertical positioning of base plate 42.

Figure 6:
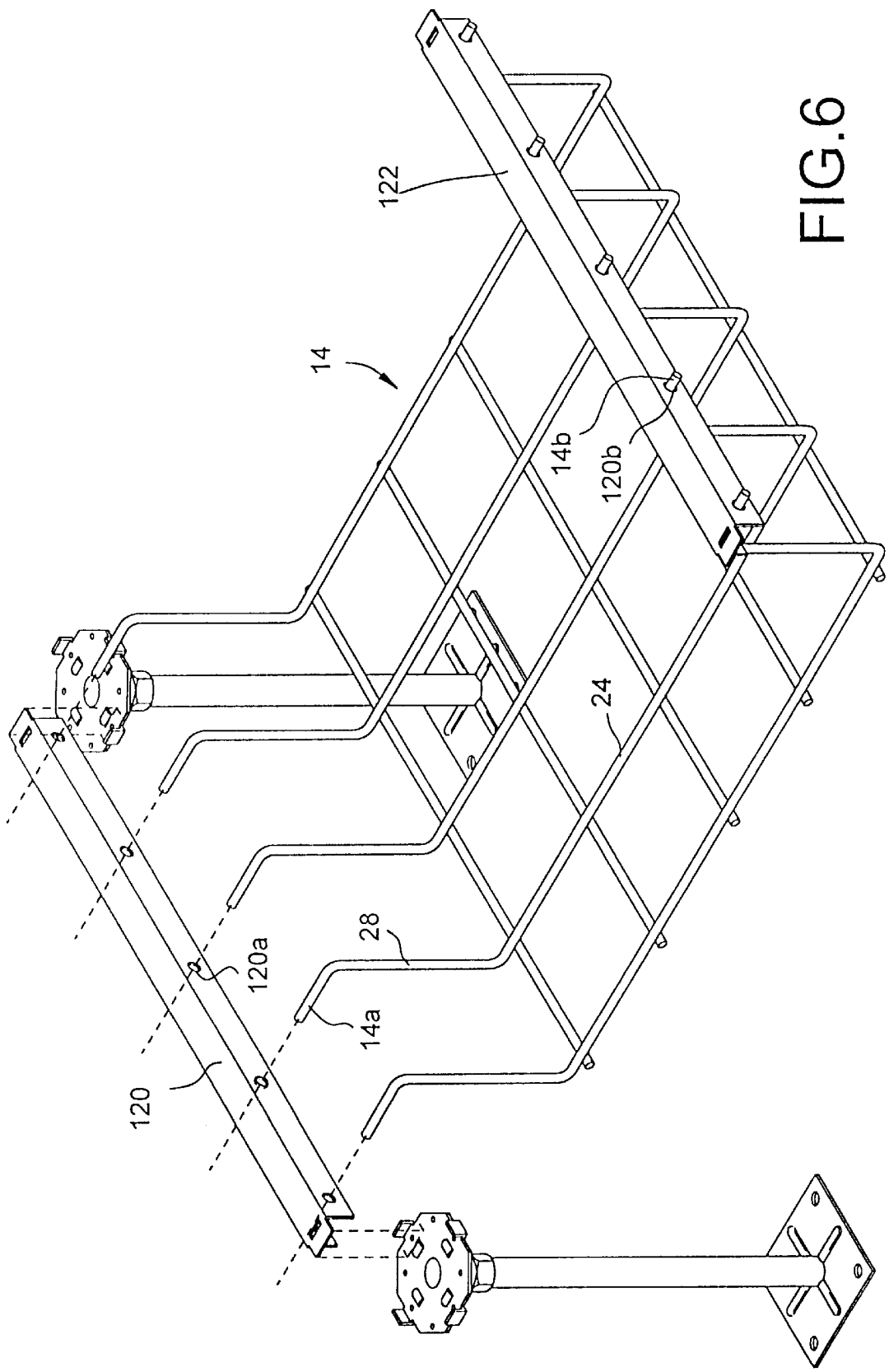
FIG. 6 is a perspective view of a further embodiment of the presently disclosed cable support assembly.

Referring to FIG. 6, an alternative method of attaching the cable basket to the stringers is shown wherein cable basket 14 has portions 14a and 14b which are formed extending outwardly from the upper portions of riser legs 28. Stringers 120 and 122, which are otherwise the same as stringers 20 and 22, are provided with a series of through-holes 120a and 120b, respectively, which may be punched out during formation of the stringers. In this manner, cable basket 14 may be suspended from stringers by inserting leg portions 14a and 14b in through-holes 120a and 120b. It is envisioned that all of the stringers of a raised floor system may be provided with through-holes similar to 120a and 120b so that a cable support system may be installed at any time and placed between any parallel rows of stringers having such support holes.

Alternatively, in existing raised floor systems which do not already have stringers with pre-formed cable basket receiving holes, such as holes 120a and 120b, the stringers positioned where it is desired to support a series of cable baskets 14 could be replaced with stringers having the pre-formed holes.

Figure 7:
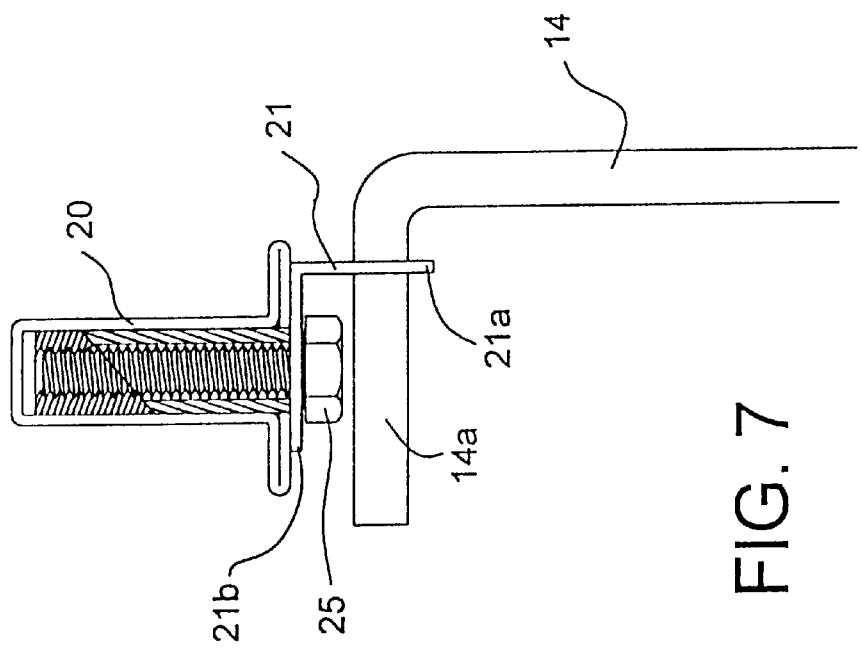
FIG. 7 is a side partial view of an alternative embodiment for mounting the cable support assembly to stringers of a raised floor system.

Referring to FIG. 7, in another alternative embodiment for suspending cable baskets 14 from stringers 20, angled brackets 21 are provided which have leg portions 21a and 21b. Leg portion 21a includes a through hole (shown in phantom lines) which receives leg portion 14a of cable basket 14. Leg portion 21b is bolted into the channel formed in the underside of stringer 20 by an expanding fastener such as wedge-bolt 25.

Figure 8:
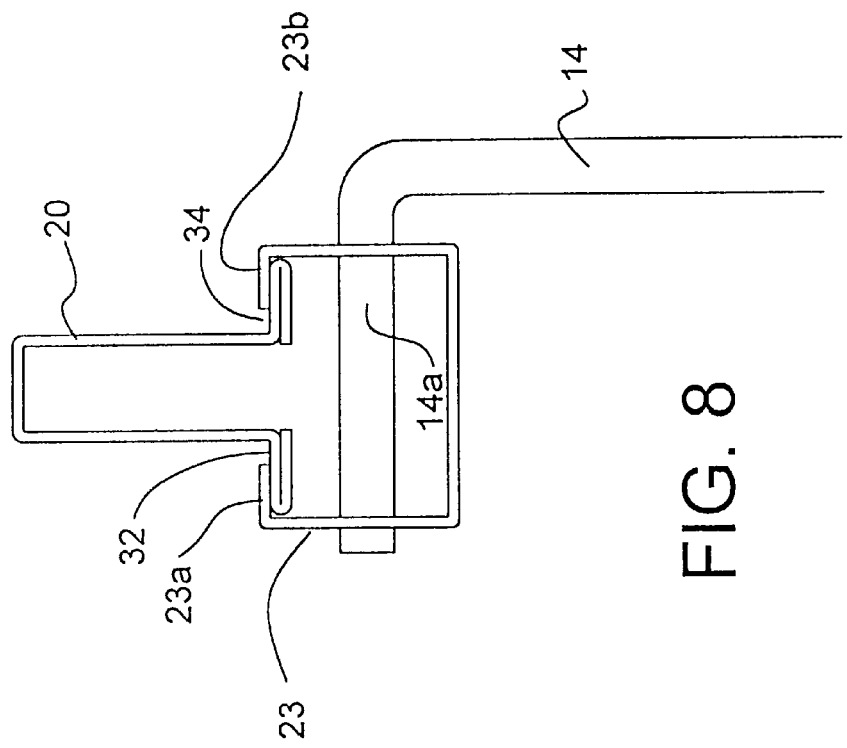
FIG. 8 is a side partial view of a further alternative embodiment for mounting the cable support assembly to stringers of a raised floor system.

Referring to FIG. 8, in a still further alternative embodiment for suspending cable baskets 14 from stringers 20, a series of clips 23 are positioned on stringers 20 by having leg portions 23a and 23b rest upon flanges 32 and 34, respectively. Leg portions 14a of baskets 14 are inserted into receiving holes formed in clips 23. Thus, baskets 14 are suspended from clips 23. In this manner, existing floor system stringers could be utilized to support the added cable baskets defining the cable support assembly.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure as defined by the appended claims.

What is claimed is:

1. A raised floor system, comprising:
   a plurality of support pedestals;
   a plurality of floor panels; and
   a cable support apparatus which includes:
   a first elongated stringer element defining a horizontally disposed surface, the surface supporting a portion of at least two of the plurality of floor panels, the first elongated stringer element being supported a predetermined distance away from a base by a first pair of the plurality of support pedestals;
   a second elongated stringer element defining a horizontally disposed surface, the surface supporting a portion of at least two of the plurality of floor panels, the second elongated stringer element being supported a predetermined distance away from the base by a second pair of the plurality of support pedestals; and
   a channel section suspended from the first and second stringer elements, the channel section being configured and dimensioned to support lengths of cable thereon.

2. The raised floor system as recited in claim 1, wherein the channel section defines a plurality of openings therein.

3. The raised floor system as recited in claim 2, wherein the channel section is formed of wire stock.

4. The raised floor system as recited in claim 1, wherein the channel section includes a plurality of support members extending from the first elongated stringer element to the second elongated stringer element.

5. The raised floor system as recited in claim 4, wherein the plurality of support members are maintained at a predetermined distance from each other.

6. The raised floor system as recited in claim 5, wherein the predetermined distance is substantially uniform.

7. The raised floor system as recited in claim 1 wherein the channel section is suspended from the first and second elongated stringer elements by permanently securing the channel section to the first and second elongated stringer elements.

8. A cable support apparatus for use with a raised floor system including a plurality of support pedestals and floor panels, the cable support apparatus comprising:
   first and second stringer elements, each of the stringer elements being adapted for removable engagement with at least two of the support pedestals of the raised floor system, each of the first and second stringer elements defining a horizontally disposed upper surface, the surface supporting a portion of at least two of the floor panels of the raised floor system; and
   a channel section suspended from the first and second stringer elements, the channel section being configured and dimensioned to support lengths of cable thereon.

9. The cable support apparatus as recited in claim 8, wherein the channel section defines a plurality of openings therein.

10. The cable support apparatus as recited in claim 9, wherein the channel section is formed of wire stock.

11. The cable support apparatus as recited in claim 8, wherein the channel section includes a plurality of support members extending from the first elongated stringer element to the second elongated stringer element.

12. The cable support apparatus as recited in claim 11, wherein the plurality of support members are maintained at a predetermined distance from each others.

13. The cable support apparatus as recited in claim 12, wherein the predetermined distance is substantially uniform.

14. The cable support apparatus as recited in claim 8 wherein the channel section is suspended from the first and second stringers elements by permanently securing the channel section to the first and second stringer elements.

15. A modular cable support assembly, comprising:

a plurality of support pedestals;

a plurality of cable support apparatus each of which includes:

a first elongated stringer element defining a horizontally disposed upper surface, the surface supporting at least a portion of two floor panels, the first elongated stringer element being supported a predetermined distance away from a base by a first pair of the plurality of support pedestals;

a second elongated stringer element defining a horizontally disposed upper surface, the surface supporting at least a portion of two floor panels, the second elongated stringer element being supported a predetermined distance away from the base by a second pair of the plurality of support pedestals; and a channel section suspended from the first and second stringer elements, the channel section being configured and dimensioned to support lengths of cable thereon.

16. The modular cable support assembly as recited in claim 15, wherein the channel section defines a plurality of openings therein.

17. The modular cable support assembly as recited in claim 16, wherein the channel section is formed of wire stock.

18. The modular cable support assembly as recited in claim 15, wherein the channel section includes a plurality of support members extending from the first elongated stringer element to the second elongated stringer element.

19. The modular cable support assembly as recited in claim 18, wherein the plurality of support members are maintained at a predetermined distance from each other.

20. The modular cable support assembly as recited in claim 19, wherein the predetermined distance is substantially uniform.

21. The modular cable support assembly as recited in claim 15 wherein the channel section is suspended from the first and second elongated stringer elements by permanently securing the channel section to the first and second elongated stringer elements.

22. A raised floor system, comprising:

a plurality of support pedestals;

a plurality of floor panels; and a cable support apparatus which includes:

at least one elongated stringer element defining a first surface and a second surface, the second surface displaced from the first surface, the second surface supporting a portion of at least one of the plurality of floor panels, the at least one elongated stringer element being supported a predetermined distance away from a base by a first pair of the plurality of support pedestals; and a channel section suspended from the at least one elongated stringer element, the channel section including a plurality of openings and being configured and dimensioned to support lengths of cable thereon.

23. A raised floor system, comprising:

a plurality of support pedestals;

a plurality of floor panels; and a cable support apparatus which includes:

at least one elongated stringer element defining a first flange and a horizontally disposed second surface, the second surface supporting a portion of at least one of the plurality of floor panels, the at least one elongated stringer element being supported a predetermined distance away from a base by a first pair of the plurality of support pedestals; and a channel section suspended from the at least one elongated stringer element, the channel section being configured and dimensioned to support lengths of cable thereon.

24. A method of forming a modular cable support apparatus comprising the steps of:

providing at least one elongated stringer element defining a horizontally disposed upper surface, the surface supporting at least a portion of two floor panels; and securing a channel section to the at least one elongated stringer element, the channel section being configured and dimensioned to support lengths of cable thereon.

25. A method of assembling a raised floor system comprising the steps of:

disposing a series of support pedestals in a predetermined array on a base;

interconnecting at least a portion of the series of support pedestals with a plurality of stringer elements to form a lattice structure;

interconnecting at least a portion of the series of support pedestals with a cable support apparatus to form part of the lattice structure, the cable support apparatus including first and second cable support apparatus stringer elements, and a channel section suspended from the first and second stringer elements, the channel section being configured and dimensioned to support lengths of cable thereon; and disposing a plurality of floor panels on the plurality of stringer elements, and the first and second cable support apparatus stringer elements to form a floor surface, such that the first and second cable support apparatus stringer elements each support at least a portion of two of the floor panels.

26. A method of installing a cable support assembly in an existing raised floor system which includes a plurality of pedestals, a plurality of stringer elements and a plurality of floor panels, comprising the steps of:

removing at least one of the plurality of floor panels of the existing raised floor system;

removing a pair of adjacent stringer elements disposed in the existing raised floor system; and replacing the removed pair of adjacent stringer elements with a cable support apparatus which includes first and second cable support apparatus stringer elements, each being adapted to support at least a portion of two floor panels thereon, and a channel section suspended from the first and second stringer elements, the channel section being configured and dimensioned to support lengths of cable thereon.

27. The method according to claim 26, which further comprises the step of replacing the at least one floor panel to cover the cable support apparatus.

* * * * *